US007448643B2

(12) United States Patent  
Kuettner et al.

(10) Patent No.: US 7,448,643 B2  
(45) Date of Patent: Nov. 11, 2008

(54) METHOD AND APPARATUS FOR TEXTILE SHEET MATERIAL

(75) Inventors: Juergen Kuettner, Leverkusen (DE); Manfred Zimmer, Langenfeld (DE); Anja Hartmann, Overath (DE); Beatrice Derner, Wuppertal (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 11/339,340

(22) Filed: Jan. 25, 2006

(65) Prior Publication Data  
US 2006/0185568 A1  Aug. 24, 2006

Related U.S. Application Data

(63) Continuation of application No. PCT/EP04/08351, filed on Jul. 26, 2004.

(51) Int. Cl.  
*B60R 21/207* (2006.01)  
*B60R 21/215* (2006.01)

(52) U.S. Cl. ................. 280/728.3; 280/730.2

(58) Field of Classification Search ............ 280/728.3, 280/730.2, 743.1; 297/216.13; 112/475.01; 428/32, 442; 264/400; 156/60, 93  
See application file for complete search history.

(56) References Cited

U.S. PATENT DOCUMENTS

| | | | | | |
|---|---|---|---|---|---|
| 1,773,967 | A | * | 8/1930 | Dreyfus | 428/57 |
| 3,007,608 | A | * | 11/1961 | Cox, Jr. | 222/105 |
| 3,819,638 | A | * | 6/1974 | Ogawa et al. | 264/292 |
| 3,852,144 | A | * | 12/1974 | Parry | 156/510 |
| 3,939,033 | A | * | 2/1976 | Grgach et al. | 156/515 |
| 4,879,155 | A | * | 11/1989 | Fujisawa | 428/131 |
| 5,085,917 | A | * | 2/1992 | Hodnett, III | 428/193 |
| 5,403,644 | A | * | 4/1995 | Fujisawa et al. | 428/137 |
| 5,442,818 | A | * | 8/1995 | Loos | 2/272 |
| 5,797,621 | A | * | 8/1998 | Ono | 280/730.2 |
| 6,003,950 | A | * | 12/1999 | Larsson | 297/452.42 |
| 6,045,151 | A | * | 4/2000 | Wu | 280/728.3 |
| 6,237,934 | B1 | * | 5/2001 | Harrell et al. | 280/728.3 |
| RE37,280 | E | * | 7/2001 | Tanaka et al. | 280/733 |
| 6,451,715 | B2 | * | 9/2002 | Li et al. | 442/76 |
| 6,502,853 | B2 | | 1/2003 | Keshavaraj | |
| 6,578,911 | B2 | * | 6/2003 | Harada et al. | 297/216.13 |

(Continued)

FOREIGN PATENT DOCUMENTS

DE  43 25 936 A1  2/1995

(Continued)

OTHER PUBLICATIONS

International Search Report for PCT/EP2004/00835, date of mailing Nov. 17, 2004, 4 pages.

(Continued)

*Primary Examiner*—Eric Culbreth  
*Assistant Examiner*—Karen Amores  
(74) *Attorney, Agent, or Firm*—Foley & Lardner LLP

(57) ABSTRACT

A method for processing a textile sheet material includes sealing a sheet material in a sealing region. The sealing region comprising at least one partial region of the surface of the sheet material. The method also includes introducing a seam into the sheet material and cutting the sheet material along a cutting line. The textile sheet material may be used to produce covers for airbags used in vehicle seats.

32 Claims, 3 Drawing Sheets

U.S. PATENT DOCUMENTS

| | | | |
|---|---|---|---|
| 6,588,838 B1 * | 7/2003 | Dick et al. | 297/216.13 |
| 6,630,220 B1 * | 10/2003 | Veiga | 428/102 |
| 6,792,883 B2 * | 9/2004 | Ashton | 112/475.01 |
| 7,134,685 B2 * | 11/2006 | Panagos et al. | 280/730.2 |
| 2002/0094411 A1 * | 7/2002 | Weiss | 428/102 |
| 2002/0106970 A1 * | 8/2002 | Falla | 450/1 |
| 2002/0140218 A1 * | 10/2002 | Beasley, Jr. | 280/743.1 |
| 2003/0207068 A1 * | 11/2003 | Fujita et al. | 428/57 |
| 2005/0156412 A1 * | 7/2005 | Panagos et al. | 280/730.2 |
| 2006/0113752 A1 * | 6/2006 | Tracht | 280/728.2 |
| 2006/0113756 A1 * | 6/2006 | Tracht | 280/730.1 |
| 2006/0113761 A1 * | 6/2006 | Tracht | 280/730.2 |
| 2006/0113762 A1 * | 6/2006 | Tracht et al. | 280/730.2 |
| 2006/0113763 A1 * | 6/2006 | Tracht et al. | 280/730.2 |
| 2006/0113765 A1 * | 6/2006 | Tracht | 280/730.2 |
| 2006/0113767 A1 * | 6/2006 | Tracht | 280/730.2 |
| 2006/0113768 A1 * | 6/2006 | Tracht et al. | 280/730.2 |
| 2006/0113769 A1 * | 6/2006 | Tracht | 280/730.2 |
| 2006/0113770 A1 * | 6/2006 | Tracht | 280/730.2 |
| 2006/0113771 A1 * | 6/2006 | Tracht | 280/730.2 |
| 2006/0113772 A1 * | 6/2006 | Tracht | 280/730.2 |
| 2006/0113773 A1 * | 6/2006 | Tracht | 280/730.2 |
| 2006/0201513 A1 * | 9/2006 | Chu | 128/206.19 |

FOREIGN PATENT DOCUMENTS

| | | |
|---|---|---|
| DE | 44 26 844 A1 | 2/1995 |
| DE | 196 33 034 A1 | 2/1997 |
| DE | 199 52 443 A1 | 5/2001 |
| JP | 9123861 | 5/1997 |
| JP | 9254735 | 9/1997 |
| JP | 10129392 | 5/1998 |
| JP | 2002037004 | 6/2002 |

OTHER PUBLICATIONS

German Patent Office Action dated Jun. 3, 2005 for DE 103 34 644.9-42, 4 pages.

German Patent Office Action dated Feb. 9, 2004 for DE 103 34 644.9-42, 3 pages.

International Preliminary Report on Patentability and Written Opinion for Application No. PCT/EP2004/008351, date of mailing Jun. 22, 2006, 10 pages.

* cited by examiner

METHOD AND APPARATUS FOR TEXTILE SHEET MATERIAL

CROSS-REFERENCE TO RELATED PATENT APPLICATIONS

This application is a Continuation of International Application No. PCT/EP2004/008351 filed on Jul. 26, 2004, which claims the benefit of German Priority Application No. DE 103 34 644.9 filed on Jul. 28, 2003. The entire disclosures of International Application No. PCT/EP2004/008351 and German Priority Application No. DE 103 34 644.9 are incorporated herein by reference.

BACKGROUND

The present invention relates to a method for processing a textile sheet material and applications in which such textile sheet materials may be utilized.

In particular in the case of vehicles, it is customary in the interior to use fabrics or cloths which, on the one hand, have an aesthetic value for enhancing the visual impression of the vehicle interior and, on the other hand, fulfill a safety function, for example, cover hard or sharp edges of components of the vehicle (e.g., vehicle seats). For this purpose, textile sheet materials of this type often have to have precisely predetermined and reliably reproducible properties, in particular with regard to their tearing resistance or in general their durability.

In particular in the case of vehicles (e.g., motor vehicles), one or more what are referred to as airbags are frequently provided to increase the safety of their users, in particular of the occupants. What are referred to as side impact airbags which are fitted either in a vehicle door or in a vehicle seat are known. A seat of this type has, in particular, a seat surface and a backrest and generally, to provide an advantageous visual design, is provided covered by a cover. A vehicle seat of this type is just one example of a vehicle component, which is also referred to below as a device.

The provision of an airbag generally involves providing what is referred to as an airbag module in the region of the seat or of the vehicle component. The airbag module or the airbag is referred to below in simplified form as "airbag". According to the invention, it is necessary, on the one hand, during long-term use of the vehicle, for an advantageous appearance of the component or of the seat to be ensured over the entire service life of the vehicle, and, on the other hand, it is necessary, in the event of the triggering of the airbag appearing necessary, for the airbag to be safely, correctly and completely triggered and deployed, this being ensured in all situations. These requirements are furthermore added to the demand for cost-effective production and the use of cost-effective materials.

For this purpose, for example, it is generally known, in the case of a vehicle seat in which an airbag is integrated, to provide a cover of the seat in such a manner that the airbag which inflates in the event of the vehicle being involved in an accident tears open a seam of the cover in order to form an outlet opening through which the side impact airbag expands. Furthermore, it is generally known to limit the locations at which the airbag emerges from the seat by attaching a reinforcing web. It is disadvantageous in this case that the location at which the airbag can emerge from the seat is nevertheless not precisely defined because all of the remaining locations (apart from the connecting region) are suitable as outlet locations. This effect is made worse by the fact that the strength values of the materials mostly used as cover material have a large variance over different production batches and a large variance over the temperature range relevant for use in a motor vehicle. Overall, the effect of an airbag is therefore less readily foreseeable, which increases the number of tests necessary before or during the production of seats of this type and, as a result, increases the costs.

The strength values of textile sheet materials, in particular the strength values of seams of textile sheet materials sewn up to one another are in a known manner often dependent on whether the material of the sewn-up sheet material unravels or frays, i.e. whether the structure of the material, for example its fabric structure, is durable or not. Known textile sheet materials (e.g., fabrics) have the tendency, after cutting, to lose their fabric structure, in particular at the border (e.g., due to fraying). This change in the fabric structure impairs the stability of a sheet material of this type, which is critical in terms of safety in particular for a use of sheet material of this type as what is referred to as airbag belts or stabilizing layers, with the result that measures are necessary to avoid such fraying, for example by undertaking a laser-guided cutting of the stabilizing layer with subsequent, partially implemented fusing of the fibers on the border. However, a disadvantage of this measure is that renewed cutting of the sheet material in turn conceals the risk of once again weakening the seam properties. It is therefore disadvantageous that known textile sheet materials are not durable in their structure (or, in the case of a sealed edge, are only durable at the latter itself).

Accordingly, it would be desirable to provide an improved textile sheet material and a method for processing it. It would also be desirable to provide a textile sheet material and a method for processing it in which a maximum degree of precision of the strength values and a maximum degree of reproducibility of the strength values of the sheet material may be obtained. It would also be desirable to provide a textile sheet material and a method for processing it in which may be produced at a relatively low material cost and with a relatively low number of tests to be carried out before or during production to determine strength values.

SUMMARY

An exemplary embodiment of the invention relates to a method for processing a textile sheet material includes sealing a sheet material in a sealing region. The sealing region comprising at least one partial region of the surface of the sheet material. The method also includes introducing a seam into the sheet material and cutting the sheet material along a cutting line.

Another exemplary embodiment of the invention relates to a textile sheet material having a seam, a surface, and at least one edge. The textile sheet material is processed by a method comprising (a) sealing the textile sheet material in a sealing region, the sealing region comprising at least one partial region of the surface of the sheet material; (b) introducing the seam into the textile sheet material; and (c) cutting the textile sheet material along a cutting line.

Another exemplary embodiment of the invention relates to a cover for a vehicle seat that includes a sheet material having a seam, a surface, and at least one edge. The sheet material includes a sealing region comprising at least one partial region of the surface of the sheet material and a cutting line along which the textile sheet material is cut.

Another exemplary embodiment of the invention relates to a vehicle seat that includes a cover having a sheet material. The sheet material includes a seam, a surface, and at least one edge. The sheet material includes a sealing region comprising at least one partial region of the surface of the sheet material and a cutting line along which the textile sheet material is cut.

BRIEF DESCRIPTION OF THE DRAWINGS

The invention is explained in more detail below with reference to exemplary embodiments illustrated in the drawings.

DETAILED DESCRIPTION

Figure 1:
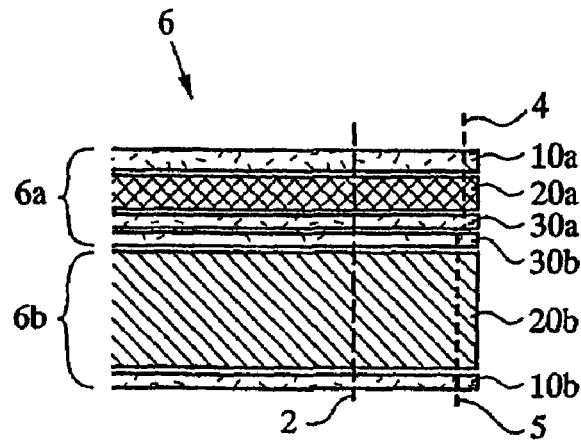
FIG. 1 shows a diagrammatic illustration of a point according to an exemplary embodiment at which a double layer of a cover material is sewn up.

According to an exemplary embodiment, a method for processing a textile sheet material is provided. Such a sheet material may be used, for example, as a cover for a vehicle component such as an airbag.

The sheet material is sealed in a sealing region in a first step, the sealing region comprising at least one partial region of the surface of the sheet material. A seam is introduced into the sheet material in a second step, and the sheet material is cut along a cutting line in a third step. By cutting the sheet material after the sealing step and also again after a sewing step, it is possible to reduce the production costs for the sheet material. It is also possible for a product to be introduced therefrom, such as, for example, an airbag or a cover because, for example, layers of the cover which are situated imprecisely above one another can be cut off in a flush manner before sewing, which facilitates the sewing operation and therefore makes it less expensive.

According to an exemplary embodiment, a textile sheet material is provided which is manufactured in particular according to the method, with a seam, a surface, and at least one edge, the sheet material being provided sealed in a sealing region, the sealing region including at least one partial region of the surface of the sheet material (and not just the edge or the edge region). The edge corresponds to the cutting line (i.e., before the cutting operation, the cutting line runs along the cut of the sheet material, the location of the cutting line forming the edge after the cutting operation is carried out).

One advantageous feature of the sealing operation is that it is possible for the sheet material (although it in particular is a critical safety part of the component or of the vehicle seat) to be further processed and, in particular, cut in just the same manner as other materials conventionally used for covers or with covers of vehicle components, since the material is prevented from fraying in the sealing region by the sealing. Provision is preferably made for the cutting line and/or the seam to be provided in the sealing region and for the sealing region to be provided adjacent to the at least one edge and/or for the seam to be provided in the sealing region. This advantageously avoids a fraying or unraveling of the sheet material in the region of the seam and/or in the region of the cutting line, i.e., the cut edge remaining after the cutting operation. This considerably reduces the costs for production and, in particular, for sewing up the sheet material according to the invention and the devices containing the latter. Furthermore, it permits a relatively large amount of creative freedom with regard to shaping and design of the vehicle component or of the device according to various exemplary embodiments.

The sheet material is also referred to below as an airbag belt and, in a particularly advantageous embodiment, is provided as a tubular belt which is sewn into the seat cover. The airbag belt then receives the airbag module, which is situated, for example, on the frame of the seat back and is intended for an airbag integrated in the seat.

Sealing within the context of the present disclosure means that the fibers of the fabric are at least partially connected to one another in such a manner that the fabric does not disintegrate (i.e., does not fray). This connection can take place by means of an at least partial, temporary, softening of the fabric structure (e.g., under the effect of temperature or a solvent). Furthermore, it is possible to connect the fibers to one another using an adhesive. Frequently, a connection of the fibers to one another on the fabric surface is sufficient.

According to an exemplary embodiment, the cutting line is provided essentially parallel to the seam and/or at least one edge is provided essentially parallel to the seam and/or the sealing region is provided in a predetermined width, in particular 5 mm, essentially parallel to the edge. It is thereby possible to keep the seam allowance as small as possible and nevertheless to obtain a very stable and above all reproducibly stable connection of the seam. For the subsequent processing of the sheet material, for example to form covers, it is therefore possible for the seam flap to have the smallest possible size (i.e., width), and so for the seam to correspondingly have less volume. It is therefore possible for a seam allowance (excess length), which is necessary for technical reasons, of approximately 8 mm, (which would unattractively thicken the seam region without a subsequent cutting of the sheet material) to be shortened below, for example, to 5 mm, without the seam (which is also referred to below as fastening seam) losing hold.

Furthermore, according to an exemplary embodiment, the sealing region is provided in a border region of the sheet material. As a result, the sheet material can be processed in a simple manner according to known methods which can be used cost-effectively to produce, for example, covers for airbags. In addition, provision is advantageously made according to an exemplary embodiment for the sealing region to be provided at a distance from the edge of the sheet material and in a predetermined width, in particular 5 mm. As a result, it is possible both to design the border of the sheet material in a manner such that it can be cut and at the same time to keep the sealing region comparatively small, which reduces the costs for producing the sealing region. It is furthermore advantageously possible to provide the nonfraying sealing region in the border region, but in the interior of the sheet material in such a manner that the fastening seam is provided in the sealing region. The region to be sealed can therefore be kept small, which reduces the production costs of the sheet material according to the invention.

According to an exemplary embodiment, the sheet material is sealed in the sealing region by means of an ultrasound treatment. This permits a particularly gentle and less destructive type of sealing which, in addition, can be applied by means of a known technology which can be used cost-effectively. As an alternative to a sealing by means of ultrasound treatment, provision is also made according to an exemplary embodiment to seal the sheet material by means of an adhesive. Such an adhesive can be provided either by means of a material different from the material of the sheet material or, preferably, by means of the same material of the sheet material. In the second alternative case, i.e., the use of an adhesive or of a material which seals the sheet material, i.e., connects the fibers of the sheet material, and is largely identical chemically to the fiber material, it is particularly advantageous that additional tests and series of tests to investigate the influence of a chemically different material can be largely avoided.

The sheet material is preferably provided in such a manner that the seam is at least partially provided as a predetermined breaking point. In this case, the seam serves, at least in partial regions, as a designated breaking point in the event of the presence of particular load ratios, for example during the opening or the deployment of an airbag which is provided in the device or component of the vehicle that is encased by the sheet material.

According to an exemplary embodiment, the sheet material is a fabric, in particular a synthetic fabric, preferably a polyamide material, and particularly preferably a PA 6.6 (polyamide 6.6) material. This has the advantage that recourse can be made to known and widely prevalent materials which, in addition, can also be provided and processed cost-effectively.

The sheet material is preferably further processed in such a manner that the sheet material is sewn up together with other layers by means of the seam, and the cutting of the sheet material is carried out together with the other layers. The sheet material is preferably provided as a stabilizing layer for an airbag which, combined together with other layers, forms a cover for a device according to an exemplary embodiment.

According to an exemplary embodiment, the sheet material may be used to produce covers for a device such as an airbag that may be integrated in a vehicle seat or other vehicle structure. In particular, the cover includes a seam as a predetermined breaking point for an airbag. The cover comprises layers, in particular fabric layers, which are conventionally used for covers for producing components, in particular in motor vehicles. Covers of this type are generally produced by various blanks of assembled layers of different materials being sewn up. In this connection, it is advantageous if the blanks which are subsequently to be sewn up are once again cut in their seam regions before the actual sewing-up because, as a result, a more precise resting of the various materials used for producing the cover on one another is possible.

According to an exemplary embodiment, it is possible to bring about a fastening seam for connecting two blanks of the cover to be produced and subsequently to produce decorative seams in the region of the fastening seam (i.e., in the spatial vicinity of or proximate to the fastening seam) in the material of the cover. During the production of the decorative seams, it is advantageous if just a single layer of the cover materials is sewn up. This means that the border region produced during the production of the fastening seam (i.e., the excess seam length) either has to be provided to be as small as possible or that the border region defined by the fastening seam on the rear side (i.e., the side facing away from the visible side of the cover) has to be cut off. The first of these alternatives presupposes that the material layers forming the cover fit on one another with great precision or are aligned with one another in particular in their border region, which advantageously takes place by means of a cutting of the border before sewing. The second of these alternatives likewise requires the materials of the cover and, in particular, of the sheet material to be cut off. Such a cutting-off is possible in a simple manner with the sheet material without incurring losses with regard to the stability of the cover due, for example, to fraying. Provision is therefore made to use for the cover a sheet material which makes it possible, after a rough cutting and sewing-up, to carry out a precise cutting together with layers of other, different materials or to bring about a cutting of a small border remaining outside the seam. This is not possible in the case of known and unsealed sheet materials—or sheet materials not sealed extensively in the interior—in particular if it is stipulated for the sheet material that it must no longer be cut after a first cutting—possibly provided with an edge sealing directed against fraying on the border—or if it is stipulated for the sheet material that a not inconsiderable seam allowance of, for example, 8 mm has to remain. Such stipulations make the seam to be brought about unattractive and cause it to be thicker.

By means of the exemplary embodiments described herein, it is possible to obtain a relatively great creative freedom with regard to the shape of the cover and therefore also the visual or aesthetic properties of the device. For example, it is possible for decorative seams to combine just a single layer of the materials of the cover. Furthermore, it is possible to sew up thicker cover layers—for example thick (e.g., greater than 18 mm) heating layers or heating pads, in which a double layer in the region of the decorative seams would not be possible or would be disproportionately expensive. The cover can thereby be provided on the device in a smoother and visually more advantageous manner.

FIG. 1 shows a diagrammatic illustration of a point according to an exemplary embodiment at which a double layer of a cover material, which is used for producing a cover 6, is sewn up. At the sewing-up point illustrated, the double layer of the cover material comprises a first individual layer 6a of the cover 6 and a second individual layer 6b of the cover 6. The two individual layers 6a, 6b are connected to each other by a seam 2 which is also referred to below as fastening seam 2. The first individual layer 6a comprises a first blank 10a of a textile sheet material 10, a first blank 20a of a functional layer 20 and a first blank 30a of a decorative material 30. The second individual layer 6b comprises a second blank 10b of the textile sheet material 10, a second blank 20b of the functional layer 20 and a second blank 30b of the decorative material 30. The fastening seam 2 is brought about at the sewing-up point through both layers 6a, 6b of the cover 6. Furthermore, a first decorative seam 4 is brought about through the first layer 6a and a second decorative seam 5 is brought about through the second layer 6b. The decorative seams 4, 5 between the fastening seam 2 and the border region of the cover 6 are brought about at different distances from the fastening seam 2, but this serves primarily for better illustration and differentiability of the decorative seams 4, 5. According to an exemplary embodiment, the decorative seams 4, 5 may also be arranged at the same distance from the fastening seam 2.

Figure 2:
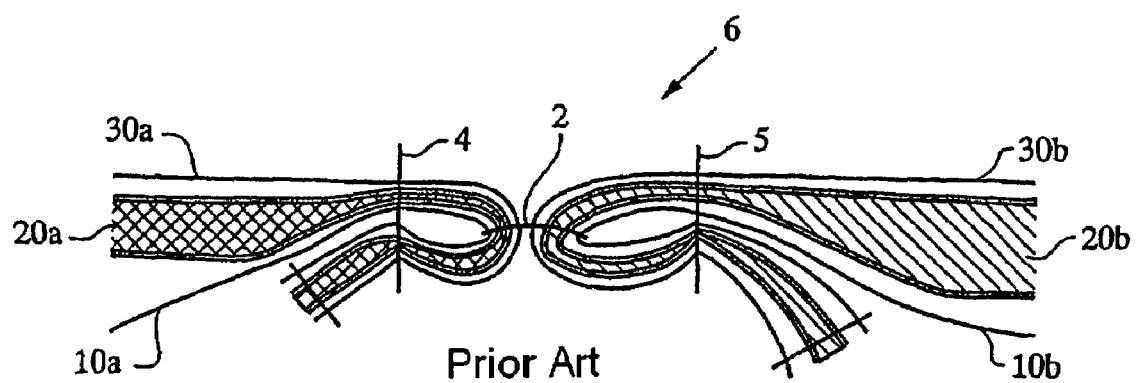
FIG. 2 shows a diagrammatic illustration of a fastening seam according to the prior art provided with decorative seams.

FIG. 2 shows a diagrammatic illustration of a fastening seam 2 according to the prior art provided with decorative seams 4, 5. In this case, in contrast to the design of the decorative seams 4, 5 according to the exemplary embodiment that is illustrated in FIG. 1, the decorative seams 4, 5 are also provided through in each case a double layer of the cover 6. In this configuration, the seam region around the fastening seam 2 becomes particularly thick and awkward, which leads to visual disadvantages and furthermore, during the production of a seam of this type, leads to disadvantages, greater waste and therefore to higher costs. The one side of that part of the cover 6 which is connected by means of the fastening seam 2 has a first blank 10a of the sheet material 10, a first blank 20a of a functional layer 20 and a first blank 30a of a decorative material 30. The other side of that part of the cover 6 which is connected by means of the fastening seam 2 has a second blank 10b of the sheet material 10, a second blank 20b of a functional layer 20 and a second blank 30b of a decorative material 30.

Figure 3:
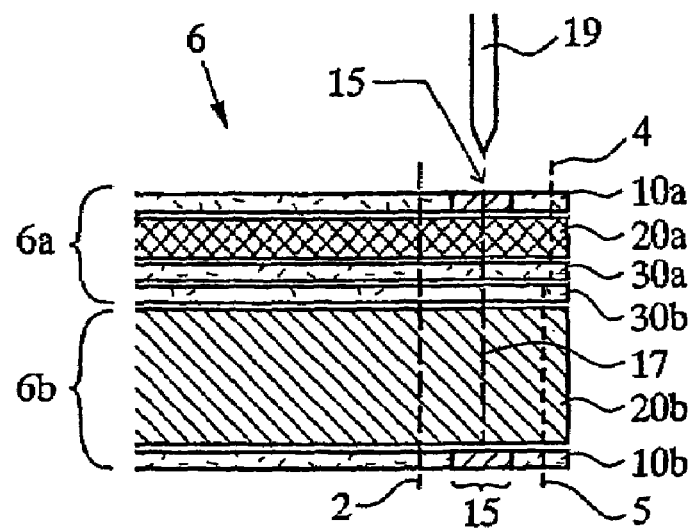
FIG. 3 shows a diagrammatic illustration of a point according to an exemplary embodiment at which a double layer of a cover material is sewn up.

FIG. 3 shows, in a manner analogous to FIG. 1, a diagrammatic illustration of a point according to an exemplary embodiment at which a double layer of a cover material, which is used for producing a cover 6, is sewn up. The same reference numbers stand for the same parts of the arrangement. The method according to an exemplary embodiment is explained in more detail in FIG. 3. Again, two individual layers 6a, 6b of the cover material are sewn up by means of the seam 2, with, in particular, a layer 10a, 10b of the textile sheet material 10 also being provided sewn-up with the other layers. The sheet material 10 has the sealing region 15 as a partial region of its surface. In FIG. 3, the seam 2 is not provided in the sealing region 15. However, it is possible according to an exemplary embodiment to provide the seam 2 in the sealing region 15. Furthermore, FIG. 3 illustrates a cutter 19 as an example of a cutting means 19 by means of which the layers of the cover material which are sewn up with one another are once again cut in a flush manner after a rough first cut (chronologically before the sewing-up operation). In this connection, provision is made in the exemplary embodiment of FIG. 3 for the edge 17 which is produced by the cutting of the cutting means 19 and is indicated in FIG. 3 by a dotted line to be provided such that it is guided through the sealing region 15. The method according to this exemplary embodiment includes three steps: sealing, sewing, and cutting. According to an exemplary embodiment, the cutting means 19 may also be designed, in particular, as a laser.

Figure 4:
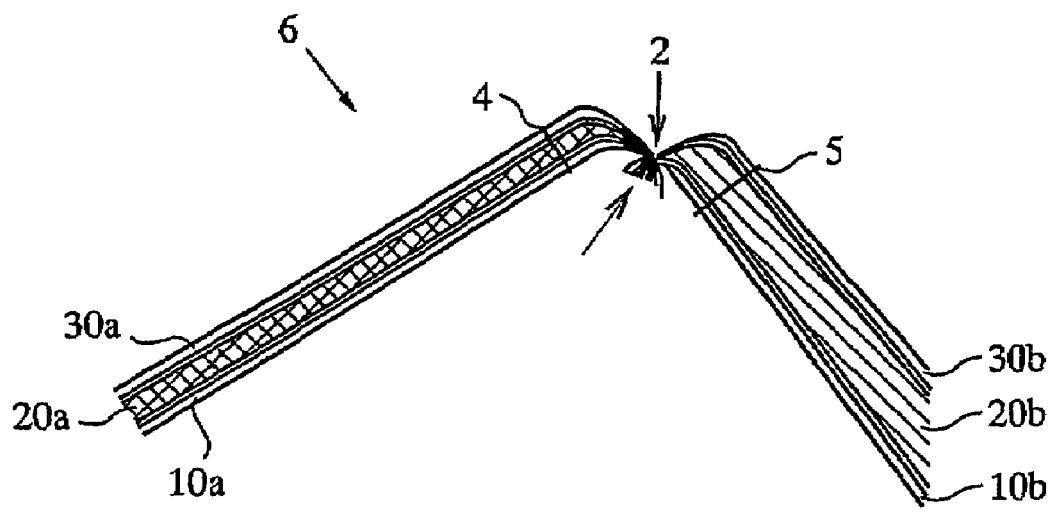
FIG. 4 shows a diagrammatic illustration of a fastening seam according to an exemplary embodiment provided with decorative seams.

FIG. 4 shows a diagrammatic illustration of a fastening seam 2 according to an exemplary embodiment provided with decorative seams 4, 5. The same reference numbers again stand for the same parts of the arrangement. In spite of the sheet material 10 which has been sewn in and determines the strength or the stability of the arrangement, the seam allowance, in particular the seam allowance of the airbag seam provided as predetermined breaking point, can be reduced, for example from 8 mm to 3 mm, because of the cutting of the closing seam that can be implemented after the sewing operation. A sewing process of this type is therefore less critical, in particular in the case of thick cover materials, the sewing capability is higher and the visual appearance is substantially improved. The method and the sheet material 10 can be used wherever seam allowances have to be reduced, for example in conjunction with airbag belts, on door panels, on overhead systems or the like.

Figure 5:
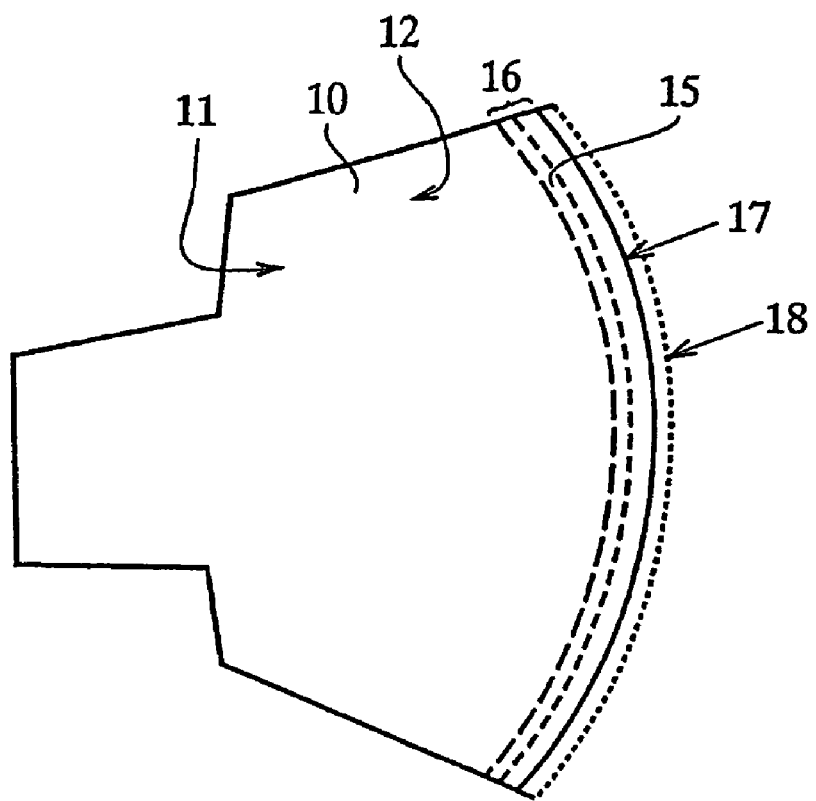
FIG. 5 shows a diagrammatic illustration of a blank of a sheet material according to an exemplary embodiment.

FIG. 5 shows a diagrammatic illustration of a blank of a sheet material 10 according to an exemplary embodiment. The sheet material 10 has a first surface 11, a second surface 12, an edge 17 and a border region 16 which has the sealed region 15. The first surface 11 is visible in FIG. 5. The edge 17 arises owing to the fact that, after a seam 2 (not illustrated in FIG. 5) is introduced into the sheet material 10, the blank is cut, to be precise along the edge 17 which corresponds to the cutting line before cutting has taken place, which cutting line is likewise referred to by the reference number 17. The reference number 18 refers to the earlier edge of the blank, i.e., the edge which existed chronologically before the cutting operation implemented with the cutting means 19. In the sealed region 15, a fraying of the fabric material of the sheet material 10 is effectively opposed by the sealing bringing about an at least partial connection or welding together of the fibers of the fabric. The sealed region 15 is at least partially provided in the interior of the blank, so that the sealed region 15 is not only situated at the edge 17 of the blank. Even if the sealed region 15 extends as far as the border 17 of the blank, the sealing region 15 in the interior of the sheet material 10 is provided by the sealing on a strip of, for example, 5 mm.

Figure 6:
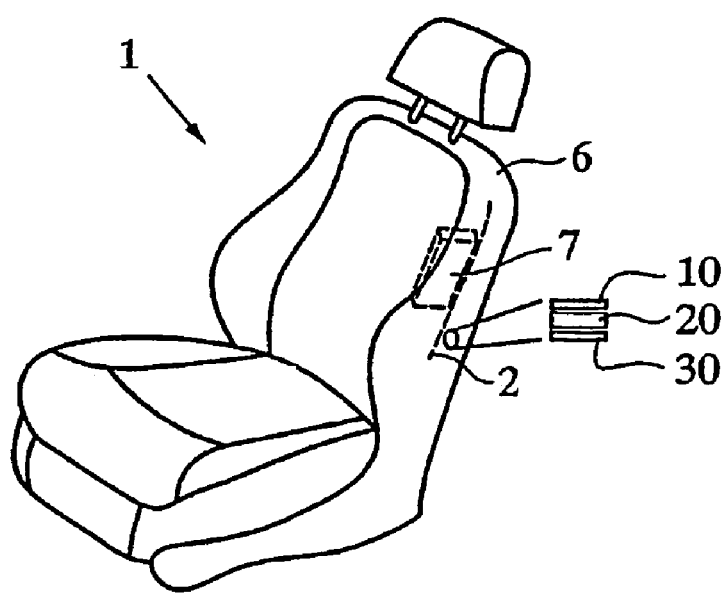
FIG. 6 shows a perspective illustration of a device according to an exemplary embodiment.

FIG. 6 shows a perspective illustration of a device 1 according to an exemplary embodiment which is provided as a seat or as another component of a motor vehicle. The device 1 has an airbag module 7 (not visible from the outside) and an outer decorative cover 6, the cover 6 having, as different layers, in particular the sheet material 10, a functional layer 20 and a layer of a decorative material 30. The functional layer 20 serves, for example, as a heating layer, as a padded layer, as a cooling layer or as a combination layer of a plurality of these functions. The functional layer 20 and the decorative material 30 are also referred to below as the other layers 20, 30 of the cover 6. According to an exemplary embodiment, the decorative material 30 is provided as a customary outer material for decorative components of motor vehicles, for example in leather, in synthetic materials such as polypropylene, or other materials of this type. A fastening seam 2 is provided in the cover 6 and is provided in particular in such a manner that two blanks of the materials of the cover 6 are provided connected to each other, with the fastening seam 2 serving as a predetermined breaking point of the cover 6 in the event of the airbag 7 being triggered. In this case, the sheet material 10 is preferably provided as a sheet material which stabilizes the cover, in particular in the form of an airbag belt 10, in such a manner that it brings about an opening of the cover 6 only in the region of the fastening seam 2 by virtue of its high tearing resistance in regions outside the fastening seam 2 in comparison to the strength of the other components of the cover 6.

It is also important to note that the construction and arrangement of the sheet material and the various products using such material as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the scope of the present inventions as expressed in the appended claims.

What is claimed is:

1. A method for processing a textile sheet material comprising:
   providing a sheet material having a portion that is to be removed;
   sealing the sheet material in a sealing region, the sealing region comprising at least one partial region of a surface of the sheet material and being spaced apart from an edge of the portion of the sheet material that is to be removed;
   introducing a seam into the sheet material;
   cutting the sheet material along a cutting line after sealing the sheet material;
   producing a cover from the textile sheet material; and
   producing a vehicle seat with the cover.

2. A method for processing a textile sheet material comprising:
   providing a sheet material having a portion that is to be removed;

sealing the sheet material in a sealing region, the sealing region comprising at least one partial region of a surface of the sheet material and being spaced apart from an edge of the portion of the sheet material that is to be removed;

introducing a seam into the sheet material; and cutting the sheet material along a cutting line after sealing the sheet material, wherein the cutting line is provided in the sealing region.

3. The method of claim 2, wherein the step of introducing the seam comprises introducing the seam in the sealing region.

4. The method of claim 2, wherein the cutting line is provided essentially parallel to the seam.

5. The method of claim 2, wherein step of sealing the sheet material in the sealing region comprises utilizing an ultrasound treatment.

6. The method of claim 2, further comprising sewing the sheet material up together with other layers by means of the seam.

7. The method of claim 6, wherein the step of cutting the sheet material is carried out together with the step of sewing the sheet material up together with the other layers.

8. A textile sheet material comprising:

a seam, a surface; and at least one finished edge; wherein the textile sheet material is processed by a method comprising (a) providing the textile sheet material with a portion that is to be removed; (b) sealing the textile sheet material in a sealing region, the sealing region comprising at least one partial region of the surface of the sheet material and being spaced apart from an edge of the portion of the sheet material that is to be removed; (c) introducing the seam into the textile sheet material; and (d) cutting the textile sheet material along a cutting line after sealing the textile sheet material to form the at least one finished edge, and wherein the textile sheet material is part of a cover for a vehicle seat.

9. The sheet material of claim 8, wherein the cover comprises a first layer and a second layer, the first layer and the second layer being connected to each other by the seam, wherein the first layer and the second layer are each formed of a plurality of blanks.

10. The sheet material of claim 8, wherein the seam is provided in the sealing region.

11. The sheet material of claim 8, wherein the at least one finished edge is provided essentially parallel to the seam.

12. The sheet material of claim 8, wherein the sealing region is provided in a predetermined width essentially parallel to the at least one finished edge.

13. A textile sheet material comprising:

a seam, a surface; and at least one finished edge; wherein the textile sheet material is processed by a method comprising (a) providing the textile sheet material with a portion that is to be removed; (b) sealing the textile sheet material in a sealing region, the sealing region comprising at least one partial region of the surface of the sheet material and being spaced apart from an edge of the portion of the sheet material that is to be removed; (c) introducing the seam into the textile sheet material; and (d) cutting the textile sheet material along a cutting line after sealing the textile sheet material to form the at least one finished edge, and wherein the textile sheet material is a stabilizing layer for an airbag.

14. The sheet material of claim 13, wherein the seam is at least partially provided as a predetermined breaking point.

15. The sheet material of claim 13, wherein the textile sheet material is a polyamide fabric.

16. A cover for a vehicle seat comprising:

a sheet material comprising a seam, a surface, and at least one finished edge;

wherein the sheet material comprises a sealing region comprising at least one partial region of the surface of the sheet material and a cutting line along which the textile sheet material is cut after a seal is provided in the sealing region to provide the at least one finished edge, the sealing region initially being spaced apart from an edge of a portion of the sheet material that is removed after cutting the sheet material along the cutting line.

17. The cover of claim 16, wherein cover is utilized in a vehicle seat.

18. The cover of claim 16, wherein the sheet material comprises at least one decorative seam provided proximate the seam, the decorative seam being sewn in a single layer.

19. The cover of claim 16, wherein the sealing region is provided in a predetermined width.

20. The cover of claim 16, wherein the seam is provided in the sealing region and the at least one finished edge is provided essentially parallel to the seam.

21. The cover of claim 16, wherein the sheet material is a stabilizing layer for an airbag.

22. The cover of claim 16, wherein the seam is at least partially provided as a predetermined breaking point for an airbag.

23. A vehicle seat comprising:

a cover comprising a sheet material, the sheet material comprising a seam, a surface, and at least one finished edge;

wherein the sheet material comprises a sealing region comprising at least one partial region of the surface of the sheet material and a cutting line along which the textile sheet material is cut after a seal is provided in the sealing region to provide the at least one finished edge, the sealing region initially being spaced apart from an edge of a portion of the sheet material that is removed after cutting the sheet material along the cutting line.

24. The vehicle seat of claim 23, wherein the sheet material comprises at least one decorative seam provided proximate the seam, the decorative seam being sewn in a single layer.

25. The vehicle seat of claim 23, wherein the cover comprises a first layer and a second layer, the first layer and the second layer being connected to each other by the seam, wherein the first layer and the second layer are each formed of a plurality of blanks.

26. The vehicle seat of claim 23, wherein the seam is provided in the sealing region.

27. The vehicle seat of claim 23, wherein the at least one finished edge is provided essentially parallel to the seam.

28. The vehicle seat of claim 23, wherein the sealing region is provided in a predetermined width essentially parallel to the at least one finished edge.

29. The vehicle seat of claim 23, wherein the seam is at least partially provided as a predetermined breaking point.

30. The vehicle seat of claim 23, wherein the textile sheet material is a polyamide fabric.

31. The vehicle seat of claim 23, further comprising an airbag provided in the vehicle seat.

32. The vehicle seat of claim 31, wherein the sheet material is a stabilizing layer for the airbag.

* * * * *